M. B. COBURN.
Machine for Molding Fire Kindlers and Fuel.

No. 224,996. Patented Mar. 2, 1880.

Attest.  Inventor.
E. R. Hill  Melville B. Coburn,
C. N. Bosworth.  per Wm. Hubbell Fisher,
Atty.

UNITED STATES PATENT OFFICE.

MELVILLE B. COBURN, OF CINCINNATI, OHIO.

MACHINE FOR MOLDING FIRE-KINDLERS AND FUEL.

SPECIFICATION forming part of Letters Patent No. 224,996, dated March 2, 1880.

Application filed March 31, 1879.

*To all whom it may concern:*

Be it known that I, MELVILLE B. COBURN, of the city of Cincinnati, county of Hamilton, and State of Ohio, have invented certain new and useful Improvements in Fire-Kindlers and Fuel, and the mechanism for the manufacture of the same, of which the following is a specification.

The object of my invention is to produce a new and valuable mechanism for manufacturing quickly and cheaply a fire-kindler made of any composition, and preferably provided with one or more orifices or passages through it, whereby the combustion of the kindler is rendered continuous, rapid, and effective.

Figure 1:
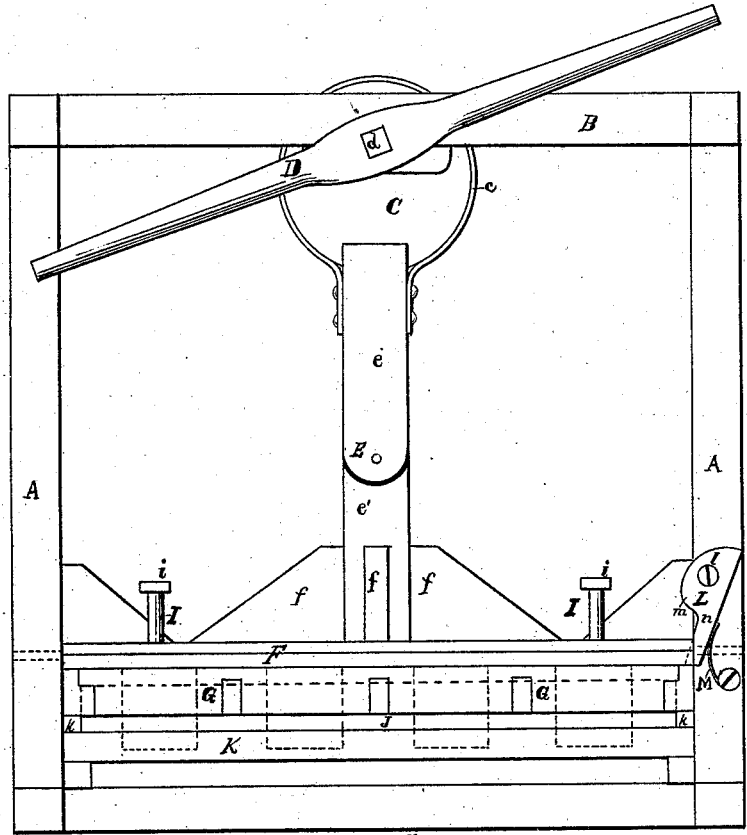
Figures 2, 3:
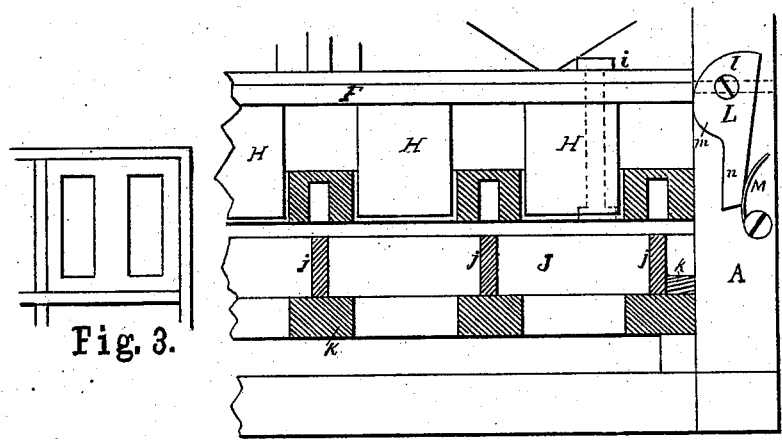

In the accompanying drawings, Figure 1 is a front elevation of my machine. Fig. 2 represents the lower right-hand half of my invention, partly in section; and Fig. 3 represents a portion of the mold after it is removed from the machine, with one of the formed fire-kindlers in position therein.

I preferably manufacture my fire-kindlers or fuel of a composition consisting of coal, resin, sawdust, and coke, in any desired proportions. When used exclusively as a kindler sawdust and resin are used in larger proportions than when used as a kindler and fuel combined. Sufficient melted resin is in all cases used to cause the sawdust, coke, and coal to closely and compactly adhere together when subjected to pressure. This compound, while plastic, is placed in a mold and compressed into the desired shape.

The exterior shape of the fire-kindler may be varied at pleasure; but it is very essential that the kindler should be provided with openings or passages through it from side to side, whereby the air and flame may pass through it and it may be more thoroughly ignited.

The preferred form of mechanism for manufacturing these kindlers is as follows, viz: A A and B is an upright frame. This frame is preferably made in four upright pieces and eight cross-pieces, four at the top and four at the bottom. A shaft, $d$, extending from front to rear of the machine, and provided at its front end with the handle D, is journaled in the cross-pieces B B. An eccentric, C, is fixed upon this shaft between cross-pieces B B. Around this eccentric is placed a ring, $c$, within which the former is at liberty to turn. Ring $c$ is attached to one member, $e$, of a knuckle-joint, E. The other member, $e'$, of this knuckle-joint E is attached to a horizontal plate, F. This plate F is raised and lowered by means of the aforesaid eccentric and knuckle-joint when the handle D is turned. It is shown in Fig. 1 at its lowest position, and in Fig. 2 at its highest.

In order to make sure that the plate F shall always rise and fall in a horizontal plane, the plate F slides in ways on the uprights A A, or is otherwise guided. A series of downwardly-projecting pieces or plungers, H H H H, &c., is attached thereto. This series of plungers runs from front to rear and from side to side of the said plate F, and the individual projections are at regular intervals apart.

G is a plate, which I will denominate the "stripper." This stripper extends through the machine, and is of the same size as the plate F. It has a series of perforations, extending from front to rear and side to side, corresponding with the plungers H, &c., on the plate F. Each of the holes in this series of holes in the stripper G is somewhat larger than the plungers, so that the said plungers may slide in and out of said holes freely.

This stripper-plate is preferably connected with the platen F in the following manner, viz: The said stripper has four or more upright rods or bolts, I I, extending upwardly from its four corners. These bolts I I extend up through holes in the platen F and have heads $i\ i$ screwed onto them. These lugs are so arranged that when the platen F is at its highest point the stripper G hangs so far below it that the lower ends of the plungers do not project below the lower face of the stripper, the said platen F being prevented from passing entirely up beyond said lugs by means of the heads $i\ i$. By this arrangement the stripper will remain at rest while the platen is raised until the platen comes in contact with the heads $i\ i$ of the bolts I I, and then both the platen and the stripper will be raised together the rest of the distance, the stripper depending from the platen by the bolts I I.

A removable mold, J, is used in connection with my machine. This mold consists in a frame-work divided up by partitions $j$ into regular spaces.

The aforesaid stripper G is provided in its under surface with recesses corresponding with the partitions $j$ in the mold J. These recesses are so arranged as to allow the stripper to set down upon and part way into the mold, the partition $j$ entering the corresponding recesses in the stripper.

The bottom of the machine consists in a perforated bed-plate, K. The top surface of this bed-plate may be formed with ways $k\ k$ to facilitate the introduction and withdrawal of the mold. The perforations in the bed-plate K correspond in size, number, and position with the perforations in the stripper G.

Catches L are attached to the corner-posts A A of the machine. Either two or four catches are used; when two, one must be affixed at opposite corners of the machine; when four, one at each corner. These catches are swung on pivots $l$, and are formed with shoulder $m$ and finger $n$. A spring, M, spends its force against the finger $n$ and keeps the said finger forced inward toward and against the platen F or its attachments. The catch L is so adjusted with reference to the platen F and stripper G that when the platen and its plungers are forced home into the stripper G and the mold J the finger $n$ of catch L is forced in over the upper edge of the said stripper by the action of the spring M, and thus prevents it (the stripper) from being raised until the catch is retracted. When the platen is raised the stripper remains in place, and cannot be raised until the finger $n$ is retracted.

The shoulder $m$ is so arranged that when the platen is elevated sufficiently to draw the plungers from the kindlers the edge of the platen will come in contact with the shoulder $m$, and thereby throw the finger $n$ back, and thus allow the stripper to be elevated by means of the bolts I.

The catches L may be differently arranged to accomplish the desired purpose—viz., holding the stripper G tightly against the material in the mold J until the plungers H are withdrawn from said material; or they may be dispensed with and different devices used to accomplish the same purpose—as, for example, rods extending to the top of the machine and operated by cams to cause them to be raised and lowered at the proper time.

Should it be desired to operate my machine by other than hand-power, the handle D may be replaced with appropriate mechanism, such as cams, levers, &c.

To operate my machine the removable mold J is taken out and filled with the soft (and usually) hot substance out of which the kindler is to be formed. Before filling the mold with the composition I saturate the mold, as also the other parts of the machine, with inflammable oil, which serves a double purpose—first, that of lubricating the mold and machine, and, second, giving an inflammable coating to the kindler or fuel, causing it to be easily ignited.

In order to keep the compound in place in the mold, it may be filled in while the mold is resting upon a flat plate—i. e., a temporary bottom. Then the plate, with the mold upon it, is taken up and placed opposite the opening in the machine from which the mold has just been taken. The mold, with its contents, is then slipped over and off of the temporary bottom into its position on the bed-plate K. The handle D is now turned and the platen depressed, the stripper resting upon the composition with which it (the mold) is filled. The platen being depressed, the plungers H H, &c., pass through the corresponding holes in the stripper and into and through the composition in the mold. The platen has now been lowered sufficiently to come in contact with the stripper, and further turning of the handle D causes both the plungers H H H, &c., on the platen F and the stripper to be pressed down and into the soft mass in the mold J. When the handle is turned so that the platen is at its lowest position the plungers H have passed entirely through the composition and have punched out pieces therefrom corresponding in size and position to the plungers. The bed-plate, perforated as aforesaid, allows of this being done, and prevents any more of the composition being pressed out of the mold than that which is pressed out in front of the downwardly-moving plungers H H. The stripper is also pressed down tightly into the mass in the mold and compresses it into a compact and solid mass. The finger $n$ of catch L, which, in the mean time, has been pressed back by the descending stripper G, springs forward (by the action of spring M) when the top surface of stripper G falls below the end of said finger. Portions of the composition having now been punched out by plungers H H, and the said mass of composition having been compressed and formed and molded by the combined action of the projections H, &c., the stripper G, and the mold J, the platen is next elevated by means of the handle D. Now, if it were not for the catches L, not only the platen F and the plungers H H, but also the stripper and the mold, would be elevated, the whole being stuck and adhering together on account of the composition in the mold. The catches, however, hold the stripper down until the plungers H H are raised entirely out of the composition in the mold. When the plungers H H have thus been raised a little additional elevation of the platen brings it in contact with shoulder $m$ of the catch L and throws the catch back until the finger $n$ no longer engages the stripper G. Further elevation brings the platen in contact with the threads $i\ i$ on the bolts I I, and, the catch L no longer preventing, the stripper is raised away from the mold and composition. The mold can now be removed and the pressed and molded kindlers removed and the operation repeated.

The blocks of fire-kindler thus formed will be found to have one or more holes punched through them, and to be effectually compressed and molded by the great pressure brought to bear upon them.

It is obvious that my machine need not be confined to making kindlers or fuel composed of the specific ingredients I have described, but that it is equally applicable where any other composition is used, the object being to produce a compressed kindler or fuel having openings for the purposes already described, and I purpose thus applying the same.

The exterior configuration of the kindler or fuel need not necessarily be such as I have described, but may be varied to suit the manufacturer.

Having thus described my invention, what I claim as new, and desire to secure by Letters Patent, is—

1. In a machine for making fire-kindlers, the combination of the platen F, provided with downwardly-projecting plungers H H H, &c., the stripper G, attached to the platen by means of the bolts I and heads $i$, the mold J, the perforated bed-plate K, and the spring-catches L, the whole operated through the eccentric-wheel and knuckle-joint, substantially as and for the purposes set forth.

2. The combination of the platen and stripper, for the purposes specified.

3. The combination of the stripper and the spring-catches, the latter being operated by the platen, substantially as and for the purposes specified.

4. The removable mold, to be used in conjunction with a fire-kindler machine, substantially as and for the purposes specified.

5. The combination of the platen, plungers, stripper, mold, and perforated bed-plate, substantially as and for the purposes specified.

MELVILLE B. COBURN.

Attest:
WILLIAM J. STREHLI,
C. H. BOSWORTH.